US008170721B2

(12) United States Patent
Nickerson

(10) Patent No.: US 8,170,721 B2
(45) Date of Patent: May 1, 2012

(54) AUTOMATICALLY ADJUSTING IRRIGATION CONTROLLER

(75) Inventor: Harvey J. Nickerson, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 12/857,485

(22) Filed: Aug. 16, 2010

(65) Prior Publication Data

US 2010/0312404 A1 Dec. 9, 2010

Related U.S. Application Data

(63) Continuation of application No. 11/750,257, filed on May 17, 2007, now Pat. No. 7,805,221.

(51) Int. Cl.
| | |
|---|---|
| G05D 11/00 | (2006.01) |
| A01G 25/00 | (2006.01) |
| A01G 27/00 | (2006.01) |
| B05B 12/08 | (2006.01) |
| B05B 17/04 | (2006.01) |
| F16K 17/36 | (2006.01) |
| F16K 31/44 | (2006.01) |
| G05B 11/00 | (2006.01) |

(52) U.S. Cl. .......... 700/282; 700/283; 700/284; 239/63; 239/64; 137/78.2; 137/78.3

(58) Field of Classification Search .......... 700/282–284; 239/63–64, 67–71; 137/78.2, 78.3
See application file for complete search history.

(56) References Cited

U.S. PATENT DOCUMENTS

| | | | |
|---|---|---|---|
| 4,015,366 | A | 4/1977 | Hall, III |
| 4,569,020 | A | 2/1986 | Snoddy et al. |
| 4,856,227 | A | 8/1989 | Oglevee et al. |
| 4,858,377 | A | 8/1989 | Oglevee et al. |
| 4,876,647 | A | 10/1989 | Gardner et al. |
| 4,922,433 | A | 5/1990 | Mark |
| 4,962,522 | A | 10/1990 | Marian |

(Continued)

FOREIGN PATENT DOCUMENTS

GB 2097555 11/1982

(Continued)

OTHER PUBLICATIONS

U.S. Appl. No. 12/892,802, Nickerson et al., filed Sep. 28, 2010.

(Continued)

*Primary Examiner* — Ronald Hartman, Jr.
(74) *Attorney, Agent, or Firm* — Fitch Even Tabin & Flannery LLP

(57) ABSTRACT

Methods and devices are provided to automatically determine plant water requirements and adjust irrigation in order to make efficient use of water. In one implementation, an irrigation control unit comprises a memory storing historical values of a plurality of variables used at least in part in calculating plant water requirements, and at least one input adapted to receive signals corresponding to current values of one or more of the plurality of variables. The unit also comprises a processor coupled to the at least one input and the memory, the processor adapted to determine the plant water requirements at least in part using, for each of the plurality of variables, a current value in the event the current value is available and at least in part using, for each of the plurality of variables, a stored historical value in the event the current value is not available.

30 Claims, 3 Drawing Sheets

U.S. PATENT DOCUMENTS

| | | | |
|---|---|---|---|
| 5,021,939 A | 6/1991 | Pulgiese | |
| 5,023,787 A | 6/1991 | Evelyn-Veere | |
| 5,025,361 A | 6/1991 | Pitman et al. | |
| 5,038,268 A | 8/1991 | Krause et al. | |
| 5,097,861 A | 3/1992 | Hopkins et al. | |
| 5,208,855 A | 5/1993 | Marian | |
| 5,229,937 A | 7/1993 | Evelyn-Veere | |
| 5,251,153 A | 10/1993 | Nielsen et al. | |
| 5,444,611 A | 8/1995 | Woytowitz et al. | |
| 5,479,339 A | 12/1995 | Miller | |
| 5,496,112 A | 3/1996 | Browne | |
| 5,497,339 A | 3/1996 | Bernard | |
| 5,668,719 A | 9/1997 | Bobrov et al. | |
| 5,696,671 A * | 12/1997 | Oliver | 700/284 |
| 5,740,038 A * | 4/1998 | Hergert | 700/284 |
| 5,839,658 A | 11/1998 | Sarver | |
| 5,870,302 A | 2/1999 | Oliver | |
| 6,088,621 A | 7/2000 | Woytowitz et al. | |
| 6,102,061 A | 8/2000 | Addink | |
| 6,108,590 A * | 8/2000 | Hergert | 700/284 |
| 6,145,755 A | 11/2000 | Feltz | |
| 6,227,220 B1 | 5/2001 | Addink | |
| 6,276,298 B1 | 8/2001 | Welsh | |
| 6,298,285 B1 | 10/2001 | Addink et al. | |
| 6,314,340 B1 | 11/2001 | Mecham et al. | |
| 6,343,255 B1 | 1/2002 | Peek et al. | |
| 6,453,215 B1 | 9/2002 | Lavoie | |
| 6,453,216 B1 | 9/2002 | McCabe et al. | |
| 6,585,168 B1 | 7/2003 | Caprio | |
| 6,675,098 B2 | 1/2004 | Peek et al. | |
| 6,748,327 B1 | 6/2004 | Watson | |
| 6,782,310 B2 * | 8/2004 | Bailey et al. | 700/284 |
| 6,782,311 B2 | 8/2004 | Barlow et al. | |
| 6,823,239 B2 | 11/2004 | Sieminski | |
| 6,850,819 B1 | 2/2005 | Townsend | |
| 6,892,113 B1 | 5/2005 | Addink et al. | |
| 6,892,114 B1 | 5/2005 | Addink et al. | |
| 6,895,987 B2 | 5/2005 | Addink et al. | |
| 6,898,467 B1 | 5/2005 | Smith et al. | |
| 6,947,811 B2 | 9/2005 | Addink et al. | |
| 7,010,394 B1 | 3/2006 | Runge et al. | |
| 7,048,204 B1 | 5/2006 | Addink et al. | |
| 7,058,478 B2 | 6/2006 | Alexanian | |
| 7,096,094 B2 | 8/2006 | Addink et al. | |
| 7,133,749 B2 | 11/2006 | Goldberg et al. | |
| 7,165,730 B2 | 1/2007 | Clark et al. | |
| 7,203,576 B1 | 4/2007 | Wilson et al. | |
| 7,266,428 B2 * | 9/2007 | Alexanian | 700/284 |
| 7,363,113 B2 | 4/2008 | Runge et al. | |
| 7,398,139 B1 | 7/2008 | Woytowitz | |
| 7,400,944 B2 | 7/2008 | Bailey et al. | |
| 7,403,840 B2 * | 7/2008 | Moore et al. | 700/284 |
| 7,406,363 B2 | 7/2008 | Doering et al. | |
| 7,412,303 B1 | 8/2008 | Porter et al. | |
| 7,421,317 B2 | 9/2008 | Christiansen | |
| 7,430,458 B2 | 9/2008 | Dansereau | |
| 7,444,207 B2 | 10/2008 | Nickerson et al. | |
| 7,469,707 B2 | 12/2008 | Anderson | |
| 7,574,284 B2 | 8/2009 | Goldberg et al. | |
| 7,805,221 B2 | 9/2010 | Nickerson | |
| 7,809,475 B2 * | 10/2010 | Kaprielian | 700/284 |
| 7,844,368 B2 | 11/2010 | Alexanian | |
| 7,853,363 B1 * | 12/2010 | Porter et al. | 700/284 |
| 7,877,168 B1 | 1/2011 | Porter et al. | |
| 2001/0049563 A1 | 12/2001 | Addink et al. | |
| 2002/0002425 A1 | 1/2002 | Dossey et al. | |
| 2002/0010516 A1 | 1/2002 | Addink et al. | |
| 2002/0014539 A1 | 2/2002 | Pagano et al. | |
| 2002/0020441 A1 | 2/2002 | Addink | |
| 2002/1002911 | 3/2002 | Peek et al. | |
| 2002/0072829 A1 | 6/2002 | Addink et al. | |
| 2002/0166898 A1 | 11/2002 | Buhler et al. | |
| 2002/0183935 A1 | 12/2002 | Skinner | |
| 2003/0093159 A1 | 5/2003 | Sieminski | |
| 2003/0109964 A1 | 6/2003 | Addink et al. | |
| 2003/0179102 A1 | 9/2003 | Barnes | |
| 2003/0182022 A1 | 9/2003 | Addink et al. | |
| 2003/0183018 A1 | 10/2003 | Addink et al. | |
| 2003/0708306 | 11/2003 | Addink et al. | |
| 2004/0003045 A1 | 1/2004 | Tucker et al. | |
| 2004/0011880 A1 | 1/2004 | Addink et al. | |
| 2004/0015270 A1 | 1/2004 | Addink et al. | |
| 2004/0030456 A1 | 2/2004 | Barlow et al. | |
| 2004/0039489 A1 | 2/2004 | Moore et al. | |
| 2004/0089164 A1 | 5/2004 | Addink et al. | |
| 2004/0181315 A1 * | 9/2004 | Cardinal et al. | 700/284 |
| 2004/0217189 A1 | 11/2004 | Regli | |
| 2004/0225412 A1 | 11/2004 | Alexanian | |
| 2005/0038529 A1 | 2/2005 | Perez et al. | |
| 2005/0038569 A1 | 2/2005 | Howard | |
| 2005/0119797 A1 | 6/2005 | Marian | |
| 2005/0143842 A1 | 6/2005 | Marian | |
| 2005/0154498 A1 | 7/2005 | Townsend | |
| 2005/0171646 A1 | 8/2005 | Miller | |
| 2005/0187665 A1 | 8/2005 | Fu | |
| 2005/0187666 A1 | 8/2005 | Marian | |
| 2005/0211792 A1 | 9/2005 | Clark et al. | |
| 2005/0211794 A1 * | 9/2005 | Clark et al. | |
| 2005/0216129 A1 * | 9/2005 | Clark et al. | |
| 2005/0279856 A1 * | 12/2005 | Nalbandian et al. | |
| 2006/0116792 A1 * | 6/2006 | Addink | |
| 2006/0122736 A1 * | 6/2006 | Alexanian | |
| 2006/0155489 A1 * | 7/2006 | Addink | |
| 2006/0157580 A1 * | 7/2006 | Regli | |
| 2006/0161309 A1 * | 7/2006 | Moore et al. | |
| 2006/0184285 A1 * | 8/2006 | Evelyn-Veere | |
| 2007/0185621 A1 * | 8/2007 | Gilmore | |
| 2007/0191991 A1 | 8/2007 | Addink | |
| 2007/0293990 A1 * | 12/2007 | Alexanian | |
| 2008/0154437 A1 * | 6/2008 | Alexanian | |
| 2008/0223950 A1 * | 9/2008 | Kates | |
| 2008/0234870 A1 * | 9/2008 | Chalemin et al. | |
| 2008/0249664 A1 * | 10/2008 | Runge et al. | |
| 2008/0275595 A1 * | 11/2008 | Bailey et al. | |
| 2008/0288116 A1 * | 11/2008 | Nickerson | |
| 2008/0288117 A1 * | 11/2008 | Nickerson et al. | |
| 2008/0319585 A1 * | 12/2008 | Nickerson et al. | |
| 2009/0008471 A1 * | 1/2009 | Wilson | |
| 2009/0150001 A1 * | 6/2009 | Fekete | |
| 2009/0216345 A1 * | 8/2009 | Christfort | |
| 2009/0271043 A1 * | 10/2009 | Roman | |
| 2009/0271045 A1 | 10/2009 | Savelle, Jr. et al. | |
| 2009/0276102 A1 * | 11/2009 | Smith et al. | |
| 2009/0326723 A1 * | 12/2009 | Moore et al. | |
| 2010/0004789 A1 | 1/2010 | Savelle, Jr. | |
| 2010/0030389 A1 | 2/2010 | Palmer et al. | |
| 2010/0082170 A1 | 4/2010 | Wilson | |
| 2010/0100247 A1 | 4/2010 | Nickerson et al. | |
| 2010/0106337 A1 | 4/2010 | Sacks | |
| 2010/0145530 A1 | 6/2010 | Nickerson et al. | |
| 2010/0145531 A1 | 6/2010 | Nickerson et al. | |
| 2010/0169017 A1 | 7/2010 | Dufaux et al. | |
| 2011/0238228 A1 | 9/2011 | Woytowitz et al. | |
| 2011/0238229 A1 | 9/2011 | Woytowitz et al. | |

FOREIGN PATENT DOCUMENTS

| | | |
|---|---|---|
| JP | 08-275684 A | 10/1996 |
| WO | WO 02/05045 | 1/2002 |
| WO | WO 02/27419 | 4/2002 |
| WO | WO 2008/1444563 | 11/2008 |

OTHER PUBLICATIONS

Allen et al.; "Crop Evapotranspiration—Guidelines for Computing Crop Water Requirements;" FAO Corporate Document Repository; 1998; pp. 1-13 and cover page; Chapter 2; http://www.fao.org/docrep/X0490E/X0490e06.htm.

Allen et al.; "Crop Evapotranspiration—Guidelines for Computing Crop Water Requirements;" FAO Corporate Document Repository; 1998; pp. 60-61 and three cover pages; Chapter 3; http://www.fao.org/docrep/X0490E/X0490e06.htm.

De Bruin, H.A.R; LaBlans, W.N.; Abstract of "Reference Crop Evapotranspiration Determined With A Modified Makkink Equation;" Hydrological Processes; Jun. 1998; 2 pgs.; Issue 7; vol. 12; http://absabs.harvard.edu/abs/1998HyPr . . . 12.1053D.

Dickstein, D.A.; "Let it Rain, High-Tech Way to Save Money Down the Drain;" The Irvine World News; Jun. 5, 1986; p. A-30; Irvine, CA.

Hardie Irrigation; "HR6200 Controller;" Hardie Irrigation; Commercially Available Prior to May 17, 2007; 1 page.
Hargreaves, G.H.; "Defining and Using Reference Evapotranspiration;" Journal of Irrigation and Drainage Engineering; Nov./Dec. 1994; pp. 1132-1139; vol. 120; No. 6.
Heermann, D.F., Harrington, G.J. and Stahl, K.M.; Mar. 1985; p. 209.
Irrigation Association; "Landscape Irrigation Auditor;" Irrigation Association; Jul. 2007; pp. 39-100 and pp. 133-140; Chapters 3 and 4 and Appendix C.
IRRI-TROL Mfg., Inc.; "MC Plus Controller;" IRRI-TROL Mfg., Inc.; Commercially Available Prior to May 17, 2007; pp. 1-2; Valencia, CA.
Mowad, Michelle; "Developer Installs Satellite-Based Irrigation to Flush Out Water Savings;" San Diego Business Journal; Mar. 5, 2007; pp. 6-7.
"On-Line Evapotranspiration;" Published Prior to May 17, 2007; p. 5.
PCT; App. No. PCT/US08/063977; International Preliminary Report on Patentability mailed Nov. 17, 2009; 4 pages.
PCT; App. No. PCT/US08/063977; International Search Report mailed Oct. 23, 2008; 3 pages.
PCT; App. No. PCT/US08/063977; Written Opinion of the International Searching Authority mailed Oct. 23, 2008; 3 pages.
Rain Bird; "ET System Overview;" May 26, 1987; pp. 1-38; Doc. No. GT27003; Rain Bird Corporation, Glendora, CA.
Rain Bird; "MAXICOM, Central Irrigation Management System;" Published Prior to May 17, 2007; pp. P16-P36 and cover page; Sec. 3.10 to Sec. 3.14; Rain Bird Corporation, Glendora, CA.
Rain Bird; "MAXICOM Computer Control System;" 1987; pp. 1-4; Rain Bird Corporation, Glendora, CA.
Rain Bird; "MAXI-ET Weather Station;" May 7, 1987; pp. 1-12; Doc. No. GT27002; Rain Bird Corporation, Glendora, CA.
Rain Bird; "MAXI FACTS;" p. 1; Rain Bird Corporation, Glendora, CA.
USPTO; U.S. Appl. No. 11/750,257; Notice of Allowance mailed Jan. 5, 2009.
USPTO; U.S. Appl. No. 11/750,257; Notice of Allowance mailed May 14, 2010.
USPTO; U.S. Appl. No. 11/750,257; Notice of Withdrawal mailed May 18, 2009.
USPTO; U.S. Appl. No. 11/750,257; Office Action mailed Apr. 2, 2008.
USPTO; U.S. Appl. No. 11/750,257; Office Action mailed Oct. 13, 2009.
Weather; "Modified Penman Combination Equation;" Apr. 9, 1990; pp. 1-5.
Weathermatic; "Mark Series Controllers;" Telsco Industries; 1985; pp. 1-4; Dallas, TX.
Weathermatic; "Smartline Controller Models SL800, SL1600, SL4800 Owner's Manual;" Telsco Industries; pp. 1-33; Commercially Available Prior to May 17, 2007; Dallas, TX.
Wikipedia; "Evapotranspiration;" http://en.wikipedia.org/wiki/Evapotranspiration; May 16, 2007; pp. 1-4.
USPTO; U.S. Appl. No. 12/332,274; Office Action mailed Feb. 4, 2011.
USPTO; U.S. Appl. No. 12/332,274; Notice of Allowance mailed Sep. 23, 2011.

* cited by examiner

AUTOMATICALLY ADJUSTING IRRIGATION CONTROLLER

This application is a continuation of U.S. application Ser. No. 11/750,257, filed May 17, 2007, for Nickerson, entitled AUTOMATICALLY ADJUSTING IRRIGATION CONTROLLER, which is incorporated herein by reference in its entirety.

BACKGROUND OF THE INVENTION

1. Field of the Invention

The present invention relates to irrigation and, in particular, to a system and method for automatically controlling irrigation.

2. Discussion of the Related Art

It is becoming increasingly important that irrigation controllers make efficient use of water. There have been several attempts to adjust the amount of water applied to landscape plant life based on weather conditions. Some attempts are based on mathematical models (known as evapotranspiration or ET) to determine plant watering requirements based on weather conditions. Most industry accepted ET models (such as the Penman-Monteith model) require weather data for temperature, solar radiation, humidity and wind speed. However, the sensors necessary to provide this weather data can be expensive and, as in the case of residential controllers, often cost prohibitive. Others have attempted to create solutions that approximate the results of the ET models by storing historical ET values which are adjusted using currently sensed temperature. However, the results are often questionable since weather is not always repeatable from year to year and factors other than temperature affect ET. Other attempts have tried alternatives to the accepted ET models in an attempt to approximate the accepted ET models. These approaches again have unproven and uncertain results.

SUMMARY OF THE INVENTION

Several embodiments of the present invention generally relates to an automatically adjusting controller that determines plant water requirements and adjusts irrigation in order to make efficient use of water.

One embodiment can be characterized as an irrigation control unit comprising a memory storing historical values of a plurality of variables used at least in part in calculating plant water requirements, and at least one input adapted to receive signals corresponding to current values of one or more of the plurality of variables. The unit also comprises a processor coupled to the at least one input and the memory, the processor adapted to determine the plant water requirements at least in part using, for each of the plurality of variables, a current value in the event the current value is available and at least in part using, for each of the plurality of variables, a stored historical value in the event the current value is not available.

In another embodiment, the invention may be characterized as a method for use in irrigation control, and means for performing the method, the method comprising the steps: determining, for each of a plurality of variables used at least in part to determine plant water requirements, whether a current value is available; and determining the plant water requirements at least in part using, for each of the plurality of variables on a variable by variable basis, the current value in the event the current value is available and at least in part using, for each of the plurality of variables, a stored historical value in the event the current value is not available.

BRIEF DESCRIPTION OF THE DRAWINGS

The above and other aspects, features and advantages of the present invention will be more apparent from the following more particular description thereof, presented in conjunction with the following drawings, wherein.

Figure 1:
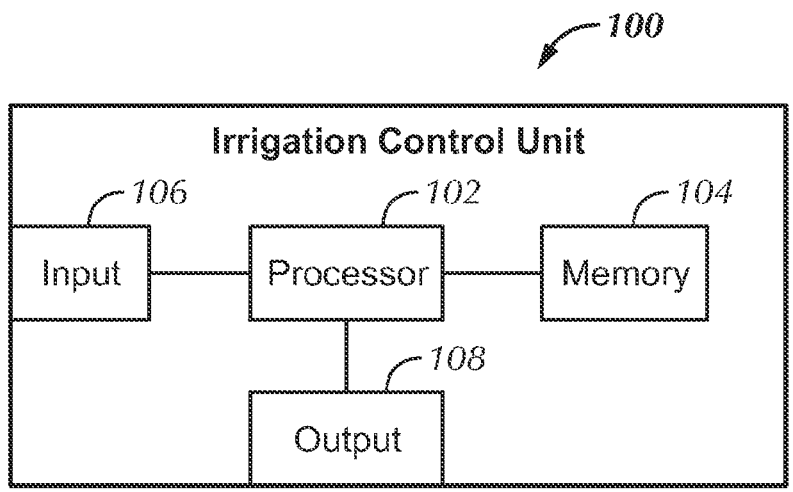
FIG. 1 is a block diagram illustrating an irrigation control unit in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the embodiments of the invention. The scope of the embodiments should be determined with reference to the claims. The present embodiments address the problems described in the background while also addressing other additional problems as will be seen from the following detailed description. It is noted that, as used in this specification and the appended claims, the singular forms "a," "an," and "the" include plural referents unless the context clearly dictates otherwise. As used herein, "comprising," "including," "containing," "characterized by," and grammatical equivalents thereof are inclusive or open-ended terms that do not exclude additional, unrecited elements or method steps.

Referring to FIG. 1, a block diagram is shown illustrating an irrigation control unit 100 in accordance with one embodiment. The irrigation control unit 100 includes a processor 102 coupled to a memory 104, at least one input 106 and an output 108. In some embodiments, the processor 102 and the memory 104 may be referred to collectively as a microcontroller. The at least one input 106 may include one or more of a variety of types of inputs, such as, user entered inputs or measured/sensed inputs from one or more sensor devices. The output 108 may be any output to cause or interrupt irrigation or may be a control output to provide messages to cause or interrupt irrigation.

Figure 2:
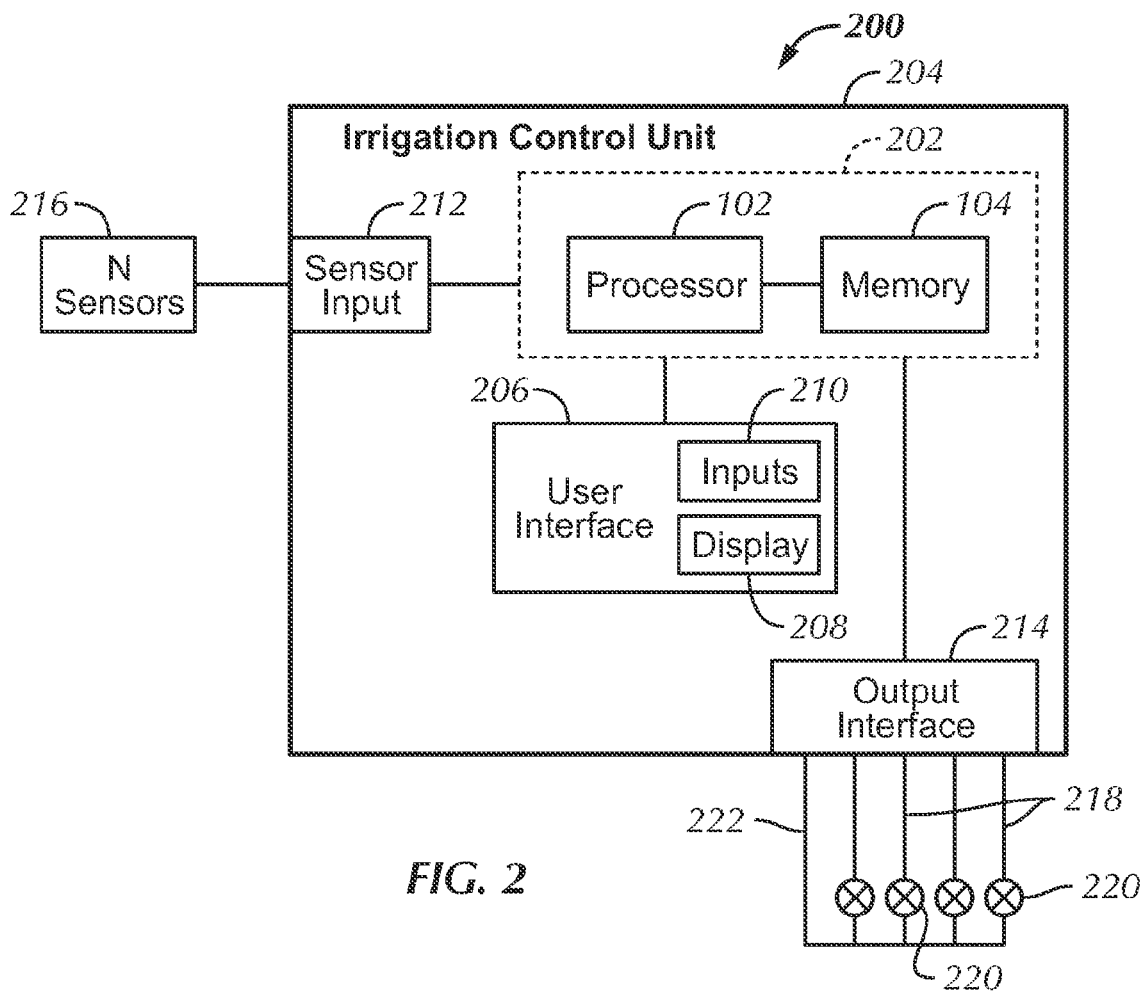
FIG. 2 is a block diagram of one embodiment of the irrigation control unit of FIG. 1.

According to several embodiments, the irrigation control unit 100 comprises a programmable irrigation controller that controls water flow to one or more irrigation stations, where each irrigation station comprises a water flow control device such as a valve or pump (for example, see FIG. 2). In other embodiments, the irrigation control unit 100 is a control device that is coupled to a programmable irrigation controller (for example, see FIG. 3). In many embodiments, the irrigation control unit 100 is adapted to make automatically generate and/or adjust watering schedules.

According to several embodiments, the irrigation control unit 100 is adapted to make efficient use of water by determining or calculating plant water requirements on a periodic basis for plant life to be irrigated. In some embodiments, the memory 104 stores historical values of one or more of the variables needed to calculate the plant water requirements. These historical values are preferably values corresponding to the geographic location of the irrigation control unit 100 and/or an irrigation controller coupled to the irrigation control unit 100. In some forms, multiple sets of historical values are stored in the memory 104, each set of historical values corresponding to a different geographic location. In use, the user inputs an indication of a specific geographic location, for example, by inputting a zip code, a map code (e.g., a THOMAS GUIDE code), a latitude and/or a longitude, or other geographic identifier. The processor 102 uses this input to select which set of historical values will be used in determining plant water requirements. In some embodiments, the historical values are pre-stored during manufacture and/or prior to sale of the irrigation control unit. In other embodiments, the historical values are entered by the user via the input 106, which is helpful in cases where historical values are not known for a given region that the irrigation control unit will be operated.

In one embodiment, plant water requirements are based on mathematical models of evapotranspiration (ET), such as the industry accepted Penman-Monteith model. The Penman-Monteith equation can be found in Crop Evapotranspiration: Guidelines for Computing Crop Water Requirements published by Food & Agriculture Organization of the United States (June 2000) and also located at http://www.fao.org on the internet and such as described in U.S. Publication Nos. 2004/0039489 and 2006/0161309 to Moore, all of which are hereby incorporated by reference in their entirety. It should be noted that as used herein, the term evapotranspiration at least refers to the actual evapotranspiration or the potential evapotranspiration determined from any of the methodologies now known or may become known in the future. This model utilizes weather data for temperature, solar radiation, humidity and wind speed to determine the amount of moisture lost by plant life due to evaporation and transpiration, i.e., ET, typically expressed in terms of inches of water. Typical systems include rain gauge sensors that measure an amount of rainfall, which can be used to offset a calculated ET value. Thus, in one embodiment, plant water requirements are determined by calculating an ET value given the temperature, solar radiation, humidity and wind speed, which is then offset by any measured amount of recent rainfall. Given the determined plant water requirements, the irrigation control unit 100 implements or adjusts a watering schedule to provide the amount of water needed by the plant life. As is recognized in the art, this watering approach is based on the needs of the plant life as opposed to a watering schedule set by user (who is often an unsophisticated user, particularly with residential irrigation controllers). It is understood that other models may be used to determine plant water requirements, such as the Penman equation, the Blaney-Criddle equation, the Makkink equation, the Hargreaves equation or other equation that can calculate or approximate an ET value, such as described in U.S. Publication Nos. 2004/0039489 and 2006/0161309 to Moore, and U.S. Pat. No. 6,314,340 to Mecham, all of which are incorporated herein by reference. For the Hargreaves equation, see Hargreaves, George H., "Defining and Using Reference Evapotranspiration", Journal of Irrigation and Drainage Engineering, vol. 120, No. 6, pp. 1132-1139, November/December 1994, and such as described in U.S. Pat. No. 6,314,340 to Mecham, both of which are incorporated herein by reference. Furthermore, one or more of these models include sub-models to calculate or approximate one or more of the variables used in the model. For example, a sub-model may approximate humidity from minimum and maximum temperature, time of year, etc. Thus, it is understood that in some embodiments, one or more of these sub-models are used at least in part to determine the plant water requirements.

However, by relying solely on pre-stored historical values of the variables needed to determine the plant water requirements, watering needs of plant life are often miscalculated since historical values of these variables are often averaged and not necessarily reflective of current weather conditions. On the other hand, it may be cost prohibitive to obtain current values of all of the variables needed to determine the plant water requirements. Some attempts have been made to approximate ET calculations using unproven models and/or sensing current values of temperature as an approximation of a current calculation of ET. According to several embodiments of the invention, it is recognized that each geographic location to be irrigated potentially has its own unique weather qualities, one or more of which may be relatively consistent with historical values and one or more of which may not be consistent with historical values. For example, an area to be irrigated within a sheltered forest region may not experience sufficient wind variability to warrant the need for wind speed sensor. In another example, a dry desert region may not experience sufficient humidity variability to warrant the need for a humidity sensor. Accordingly, in some embodiments, the irrigation control unit 100 includes the input 106 to receive signals corresponding to current values of one or more of the variables used in determining or calculating plant water requirements. Recognizing that it is not always cost-effective in all implementations of an irrigation controller to include sensors to measure all of the variables needed to determine plant water requirements, a user is provided the flexibility to add one or more sensors to sense current values of one or more variables depending on the budget of a user and the specific weather characteristics of a location or geographic region to be irrigated. Depending on the embodiment, the input 106 receives current values of variables from sensor devices or from user inputs via a user interface, for example.

The processor 102 determines, for each variable to be used in the plant water requirement determination on a variable by variable basis, whether or not a current value for that variable is available. For example, the processor 102 makes this determination, by: being informed by the sensor/s corresponding to the variable/s (either directly in signaling or in response to a query from the processor 102); being informed by the user via user input when the sensor/s corresponding to the variable/s is/are connected to the irrigation control unit; or detecting the presence or connection of the sensor/s corresponding to the variable/s. Then, plant water requirements are determined (e.g., calculated, estimated, etc.) at least in part using, for each variable, a current value in the event it is available instead of a stored historical value, and at least in part using, for each variable, the stored historical value in the event the current value is not available. As a result, in some embodiments, the plant water requirements are determined using a combination of current values for one or more variables and stored historical values for one or more other variables. In some embodiments, this provides an advantage in that watering schedules or adjustments to watering schedules are determined using the known and proven mathematical models but without requiring currently sensed values for all variables used in the calculation. For example, this would eliminate the need to purchase a full weather station capable of sensing current values or the need to receive periodic broadcasts of current values of these variables, which often requires a recurring subscription (e.g., paying for the paging of information to an irrigation controller).

It is recognized that obtaining current values for all of the variables generally leads to the most accurate results when determining plant water requirements, and that sole reliance on stored historical values may lead to the inaccurate results in some geographic locations. Accordingly, the user can decide for a particular geographic location to be irrigated how many, if any, sensor devices should be used. In some cases, a user may be willing to accept a certain amount of inaccuracy in the calculation of plant water requirements given the cost of one or more sensors. However, the user has the flexibility to pick and choose which sensors will be used to provide current values of weather data for the given location or region and for which variables historical values will suffice. In one example of a residential irrigation controller, the user determines that for that particular location, humidity and wind speed are relatively consistent with historical values, whereas temperature and solar radiation tend to vary with respect to historical values for that location. Accordingly, the user couples a temperature sensor and a solar radiation sensor to the input 106. The processor 102 determines that current values are available for temperature and solar radiation and uses those current values together with the historical values of wind speed and humidity when determining the plant water requirements. Additionally, the determined plant water requirements may be further adjusted by local offsets, such as crop or soil characteristics, slope or other local conditions.

Depending on the embodiment, the determined plant water requirements may be used in a variety of ways. In one embodiment, the plant water requirement is used to create a watering schedule for one or more irrigation stations controlling the flow of water to an area to be irrigated. Typically, each irrigation station includes a flow control device, such as a valve or pump, that controls the flow of water therethrough to one or more sprinkler or watering devices. The watering schedule may be as simple as defining a start time for irrigation and a duration for irrigation for each station. In many embodiments, the plant water requirements will determine if irrigation is needed at a particular point in time, and if needed, then for how long irrigation is needed. Plant water requirements can be recalculated on a periodic basis as needed, for example hourly, daily, weekly, monthly, etc.

In another embodiment, the plant water requirement is used to adjust, modify or limit an existing watering schedule. For example, for each station, an existing watering schedule may be programmed to irrigate on defined watering days, at defined start times, and for defined durations. If the calculated plant water requirement indicates that watering is not needed on a particular watering day, the already programmed irrigation schedule will be interrupted on that day. If the calculated plant water requirement indicates that watering is needed on a particular watering day but for more or less than the predefined duration, the already programmed irrigation schedule will be adjusted or interrupted. For example, interruption of a programmed irrigation schedule can occur within the processor 102 (e.g., in the event the processor 102 is part of an irrigation controller) or can occur as a result of an interruption of the common line 222 return in a typical irrigation actuation line (e.g., in the event the processor 102 is part of a control device coupled to an irrigation controller). Several embodiments of the invention are used with time-based preprogrammed irrigation schedules, while several embodiments are used with weather-based and/or ET-based irrigation schedules.

Generally, while referring to historical and current values of variables used to determine plant water requirements, historical values refer to values corresponding to previous periods of time in terms of weather conditions whereas current values refer to values corresponding to a current period of time in terms of weather conditions. Depending on the embodiment and variability of weather conditions, historical values may be considered a value as early as one date prior to the current time.

The historical measurements may be stored according to day of the year, month of the year, season of the year, particular time of a particular day of the year, or other periodic reference point. For example, in some embodiments historical temperature data is stored for each day of the year for a variety of locations, such as in each zip code in the United States.

The at least one input 106 is adapted to receive a variety of types of inputs. For example, in several embodiments at least one input 106 receives signals from one or more sensor devices. For example, N sensors are coupled to the at least one input 106, where N=0, 1, 2, 3, 4, . . . . A sensor may output signaling corresponding to a single variable, or may be a combination sensor that output signaling corresponding to multiple variables. According to several embodiments, sensors may include one or more of a temperature sensor, a solar radiation sensor, a humidity sensor, a wind speed sensor, a rain sensor, etc. Additionally, one or more of the sensor devices may be integrated into or internal to the irrigation control unit 100. In some embodiments, one or more sensors are external to the irrigation control unit 100 in a location proximate to or local in relation to the location of the irrigation control unit 100. In some embodiments, one or more sensor devices may be located away from or remote in relationship to the location of the irrigation control unit 100. According to different embodiments, the at least one input 106 comprises one or more of a wireline input, a fiber-optic input or a wireless input in order to receive signals from sensors via wireline, fiber-optic connection, or wirelessly (e.g., using radio frequency or infrared signaling). In one form, the processor 102 receives the signals from the at least one input 106 and determines the number and type of sensor/s coupled to or integral with the irrigation control unit 100.

Additionally, the input 106 is adapted to receive user input values that are used as the historical values stored in the memory 104 for future use or to receive user input values that are current values. User input current values may be used where the user determines or knows the current value of a variable and a sensor is not available. For example, the user input includes one or more of a keypad, a touchpad, a touch screen, a mouse, a dial, a switch, a button, a lever or other types of devices used to input information into the irrigation control unit.

Generally, the memory 104 is any type of storage medium capable of temporarily or permanently storing or buffering information, for example, a built-in hard disk drive, non-volatile flash memory, RAM, ROM, EEPROM, removable/insertable memory or any combination thereof. All or a portion of the memory 104 may be in the form of one or more removable blocks, modules or chips. The memory 104 need not be one physical memory device, but can include one or more separate memory devices. Furthermore, the memory 104 may be separate from or integrated with the processor 102. The functionality of the processor 102 and the memory 104 may be implemented as one of more of hardware, software or firmware.

The output 108 may be an output interface to cause irrigation, e.g., an interface for one or more actuation lines to couple to flow control devices (such as valves or pumps). In such case, the output 108 includes controllable switches and drivers to switch AC voltage signals or DC pulse voltage signals to a particular actuation line. DC pulse signals are commonly used with latching solenoids. In other embodiments, the output 108 is an encoder adapted to be coupled to a multi-wire path coupled to multiple decoder devices. In such case, the output 108 switches and modulates an AC or DC signal with data instructing one or more of the decoder devices to start or stop irrigation. In other embodiments, the output 108 is a control message output that outputs signaling to a wireline or wireless transmitter to send control signals to another device, e.g., an irrigation controller executing a watering schedule. In further embodiments, the output 108 is a controllable switch, e.g., that can electrically complete or break a return common line path for irrigation actuation lines of another irrigation controller.

Referring next to FIG. 2, a block diagram is shown of one embodiment of the irrigation control unit of FIG. 1. In this embodiment, an irrigation control unit 200 includes the processor 102, the memory 104 (which in this embodiment, are collectively as a microcontroller 202), a user interface 206 including a display 208 and user inputs 210, a sensor input interface 212 and an output interface 214, all generally contained within or integrated with a housing 204. Also illustrated are N number of sensors 216 (where N=0, 1, 2, 3, 4, ...), one or more actuation lines 218 each coupled to a flow control device 220 (e.g., a valve or pump) and a common line 222.

In this embodiment, the irrigation control unit 200 comprises a programmable irrigation controller including functionality in accordance with several embodiments for automatically determining plant water requirements and creating, adjusting or limiting watering schedules. That is, as generally understood, a user interacts with the user interface 206 to input, program or create one or more watering schedules or programs stored in the memory 104 and executed by the processor 102. In a typical irrigation controller, the processor 102 outputs signaling to the output interface 214 to cause actuation signals (e.g., AC voltage signals or DC pulse signals) to be applied to one or more of the actuation lines 218. When an actuation signal is applied to a given actuation line 218, the corresponding flow control device 220 is actuated (e.g., opened or closed) to allow or stop watering. For example, the output interface 214 includes drivers and switches that selectively switch a 24 volt AC power signal to one or more of the actuation lines 218. Additionally, the sensor input interface 212 provides a coupling point for one or more sensors 216, such as the sensors described above. Signaling received at the sensor input interface 212 is sent to the microcontroller 202 for storage and processing. In other embodiments, the output interface 214 may be an encoder output to a multi-wire path (e.g., a two-wire path) including multiple decoder devices.

The user interface 206 includes user inputs 210 and the display 208. The user inputs include, for example, one or more of a keypad, a touchpad, a touch screen, a mouse, a dial, a switch, a button, a lever or other types of devices used to input information into the irrigation control unit 200. The display 208 includes one or more of a display screen, indicator lights (e.g., LEDs), and audible indicators or other types of display devices. The user interface 206 is used to program and operate the irrigation control unit 200. According to some embodiments, during the initial setup or at a later time, the user inputs a variety of information, including, for example, location of the irrigation control unit 200, day of the year, soil type, gradient of the landscape, vegetation or plant type that is to be watered, number or type of sensor(s) 216 coupled to the irrigation control unit 200, start times, watering durations, water windows, non-watering days, or other factors or variables used in creating or adjusting watering schedules. In other embodiments, the number/type of sensors 216 coupled to the irrigation control unit 200 is automatically determined by the irrigation control unit 200. In some forms, the location of the irrigation control unit 200 location is entered by inputting a zip code, a map code (e.g., a THOMAS GUIDE code) or longitudinal and/or latitudinal coordinate for the location to be irrigated. In several embodiments, the processor uses this location information to select a given set of historical values stored in the memory 104. Using the date and/or time, the processor 102 determines what portion of the given set of historical values will be used in determining plant water requirements.

In some embodiments, the user interface 206 is used to enter historical data values for one or more of the variables used to determine the water plant requirements. This historical data may be used to replace or supplement any historical data already stored in the memory. In some embodiments where historical data is unknown for the region of operation during manufacture, the user interface allows the user to enter historical data specific to the region of operation. In some embodiments, no historical data values are pre-stored prior to sale because it is known beforehand that the irrigation control unit will be sold for use in a region with unknown historical data.

The sensor input 212 receives signals from one or more sensors and forwards this information to the processor 102 and/or the memory 104. These signals correspond to current values of one or more of the variables used to determine plant water requirements. Depending on the type of sensor, the signals received at the sensor input 212 are electrical signals having a characteristic that relates to a particular value. For example, a signal having a certain voltage level corresponds to a given value for a variable. In another embodiment, the presence of a signal at the sensor input 212 corresponds to a given value. For example, the signal may be a pulse signal, each pulse corresponding to a certain incremental value of a variable. In other embodiments, the signals received at the sensor input 212 are data signals defining one or more values for one or more variables. In each case, the signals received at the sensor input 212 correspond to a current value of a given variable. As described above, the sensor input 212 may receive signals corresponding to values of temperature, solar radiation, humidity, wind speed, an amount of rainfall, soil moisture, or other variables used by irrigation controllers.

In many embodiments, the processor determines the number and type of sensor/s connected to the sensor input 212 and; thus, knows for which variables current values are available. In one form, the processor detects the presence of a given sensor connected or coupled to the sensor input 212. For example, the connection of a given sensor causes an electrical impedance at the sensor input to vary which allows the processor 102 to determine how many and what type of sensors are connected. In another form, the processor 102 makes this determination by being informed by the sensor/s. For example, some sensors are capable of providing signaling that indicates the type of sensor to the processor. This signaling may be directly transmitted to the sensor input 212 on connection, transmitted when data and/or signaling is output from the sensor or transmitted in response to a query issued by the processor 102. In another form, the processor 102 is informed by the user via user input 210 when the sensor/s is/are connected to the irrigation control unit. For example, via user inputs, such as dials, buttons, etc together with displayed menus, the user inputs the type and number of sensors coupled to the sensor input 212.

The sensor input 212 is adapted to receive signals from sensors in a variety of ways, e.g., by wireline, fiber optic cable, and wireless communication. One or more of the sensors 216 are local sensors in that they are located at or proximate to the location to be watered, whereas one or more of the sensors 216 are remote sensors in that they are located at a distance from the location to be watered. In some embodiments, the current values are broadcast by wireline and/or wirelessly and received at the sensor input 212. In some embodiments (not illustrated), one or more sensors 216 are integrated into the housing 204 of the irrigation control unit 204. In other embodiments, the current values are input by the user, for example, via the user interface 206. For example, the user simply enters the current value for one or more variables. That is, in the appropriate menu option, the user enters the current values known to the user other than by using a sensor coupled to the irrigation control unit 200.

The processor 102 and the memory 104 are similar to that described in FIG. 1. The processor is generally coupled through one or more electrical connections (e.g., via a bus structure) to the user interface 206, the output interface 214 and the sensor input 212. The processor 102 is programmed to periodically determine or calculate plant water requirements based on a plurality of variables. For each variable used to determine the plant water requirements on a variable by variable basis, the processor 102 uses the historical value stored in the memory 104 unless a current value for that variable is available (e.g., as received at the sensor input 212 and/or stored in the memory 104). As a result, in some embodiments, the plant water requirements are determined at least using a combination of current values for one or more variables and stored historical values for one or more other variables. In this way, the user is given flexibility to decide for a particular region to be watered how many, if any, sensors should be used. That is, the user has the flexibility to pick and choose which sensors 216 will be used to provide current values of weather data for the region and for which variables historical values will suffice. Advantageously, watering schedules or adjustments to watering schedules are determined using known and proven mathematical models for plant water requirements, but without requiring currently sensed values for all variables used in the calculation. In one embodiment, the plant water requirements are based on mathematical models of ET. Most industry accepted models, such as the Penman-Monteith model require values for temperature, solar radiation, humidity and wind speed. Additionally, the calculated values of ET are offset in some embodiments by measurements of rainfall or other local factors.

As described above, the plant water requirements are used in different ways by the processor 102 in different embodiments. For example, in one implementation, the irrigation control unit 200 is programmed with a watering schedule including, for example, watering days, start times, frequency of watering per watering day, and durations for one or more flow control devices 220. However, it is understood that a watering schedule may not require all of these variables to be programmed. For example, one or more of these variables may be set or not otherwise programmable. In one embodiment, a user inputs a start time and a watering duration to define a watering schedule for each station. This schedule is stored in the memory 104 and executed by the processor 102. However, the sensor input 212 receives currently sensed values for one or more variables. These variables are stored in the memory 104. On a periodic basis, the processor 102 determines what are the actual plant water requirements and makes adjustments to or overrides the programmed watering schedules. For example, the processor 102 determines the plant water requirements using at least in part the stored historical values for each variable unless a current value for the given historical value is available. If it is determined that the plants to be watered require less water than would be provided by the programmed watering schedule, the processor 102 adjusts the watering schedule. For example, the processor 102 shortens watering durations or eliminates one or more watering events altogether. This adjustment or overriding can be performed in the execution of the schedule or may be performed by simply disallowing or disabling the output interface 214 from outputting control signals on the actuation lines 218. For example, the processor 102 may generate a signal that opens a switch that breaks the common line 222 that acts as a return line for the actuation lines 218. Once broken, the electrical path for the signaling on the actuation lines is interrupted and the watering schedule is overridden or interrupted. If it is determined that the plants to be watered require more water than would be provided by the programmed watering schedule, the processor 102 adjusts the watering schedule. For example, the processor 102 extends watering durations or adds one or more watering events.

In other embodiments, the user does not program a watering schedule as is normally understood. Instead, the user simply programs the processor 102 (via the user interface 206) to define certain watering days and start times, without defining watering durations or frequency of watering per day. On a periodic basis (e.g., every day, every other day, every week, etc.), the processor 102 determines plant water requirements based on the historical/current values of the variables as described above. In several embodiments, the plant water requirements are expressed in terms of a unit of measurement water (e.g., inches or centimeters) that is lost by plant life and should be replenished through irrigation. Once the plant water requirements are determined, the processor 102 determines whether or not the plant life requires watering at all. If it is determined that watering is required, the processor 102 then determines what duration of watering will provide the determined plant water requirement. For example, if the plant water requirements (e.g., a calculated ET value adjusted by any rainfall received since the last calculation) result in that 0.25 inches of water should be applied by the irrigation control unit 200, then the processor 102 determines (given flow control device 220 flow rate, water pressure, etc.) the duration of irrigation. The processor 102 then outputs signaling to the output interface 214 at the start time to cause irrigation for the specified duration. In this embodiment, the watering schedule is calculated based on the plant water requirements, as opposed to adjusting or limiting a programmed watering schedule. In either case, these embodiments allow for the efficient use of water.

Figure 3:
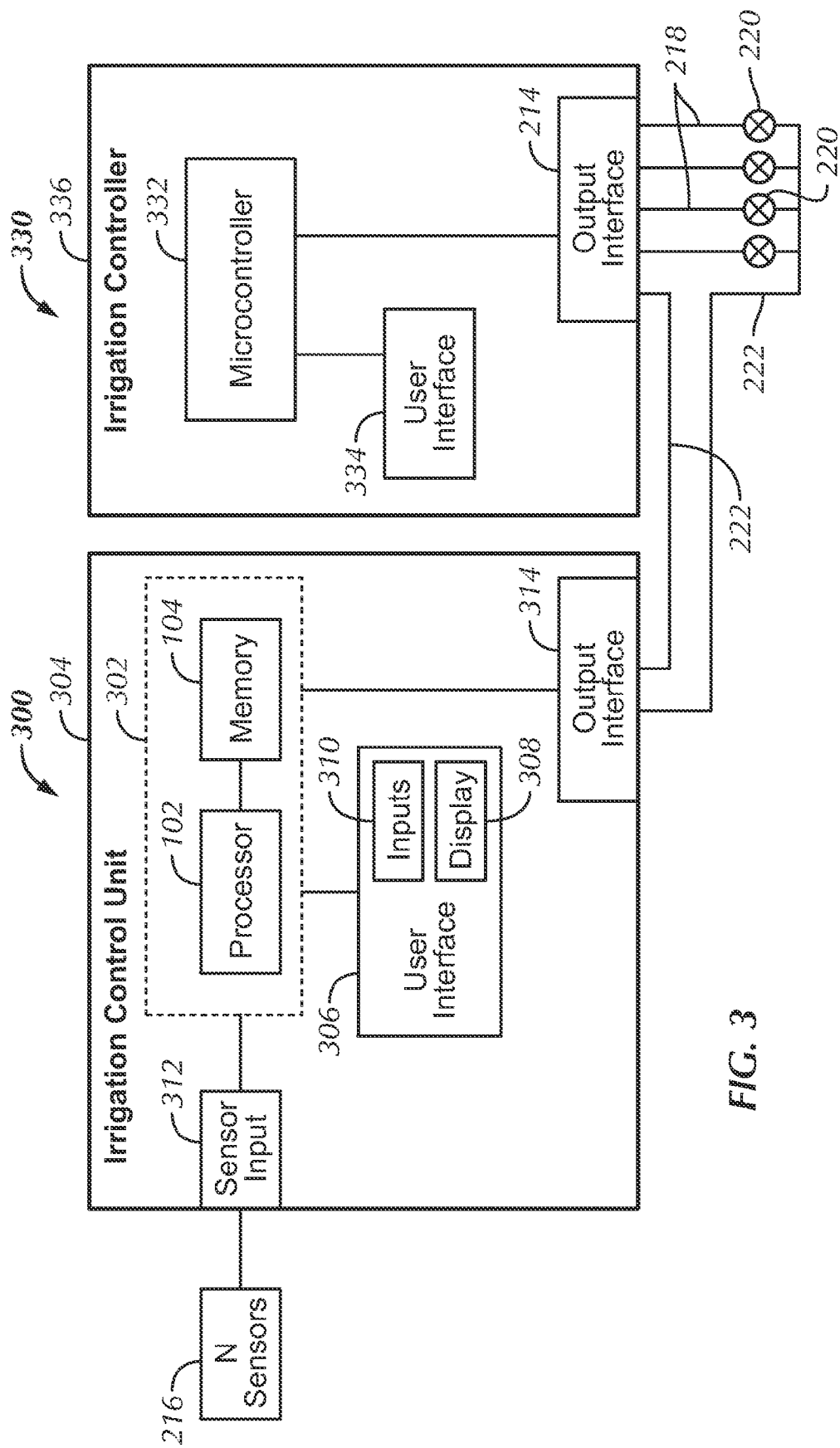
FIG. 3 is block diagram of another embodiment of the irrigation control unit of FIG. 1.

Referring next to FIG. 3, a block diagram is shown of another embodiment of the irrigation control unit of FIG. 1. In this embodiment, an irrigation control unit 300 is separate from (non-integrated with) a traditional programmable irrigation controller 330. The irrigation control unit 300 includes the processor 102, the memory 104 (which in this embodiment, are collectively as a microcontroller 302), a user interface 306 including a display 308 and user inputs 310, a sensor input 312 and an output interface 314, all generally contained within or integrated with a housing 304. The irrigation controller 330 includes a microcontroller 332, a user interface 334, and an output interface 214 all generally contained within or integrated with a housing 336. Also illustrated are N number of sensors 216 (where N=0, 1, 2, 3, 4, . . . ) coupled to the sensor input 312, one or more actuation lines 218 each coupling the output interface 214 to a flow control device 220 (e.g., a valve or pump) and a common line 222.

In this embodiment, the irrigation control unit 300 is an add-on or accessory control device that is coupled to the traditional programmable irrigation controller 330. As is well known, the controller 330 irrigates based on programmed time-based watering schedules. For example, a user interacts with the user interface 334 to set or program one or more watering schedules stored in and executed by the microcontroller 332. In one example, for each flow control device 220 (often referred to as a zone or station), the microcontroller 332 is programmed to water on certain days and at certain times and for certain durations as set by the user. As described above, when the schedule indicates that watering should occur for a given flow control device 220, the output interface 214 switches an activation signal on a given actuation line 218 to the given flow control device 220 causing water to flow therethrough to one or more sprinkler devices.

According to several embodiments, the irrigation control unit 300 periodically and automatically adjusts, interrupts and/or overrides watering schedules implemented in the irrigation controller 330. Depending on the embodiment, the irrigation control unit 300 can operate together with the irrigation controller 330 or operate completely independent of the irrigation controller 330 without its knowledge. In the illustrated embodiment, the irrigation control unit 300 is coupled to the irrigation controller 300 in that the common line 222 serially connects through the output interface 314 back to the output interface 214. In other words, the output interface 314 is in an electrical position on the common line 222 in between each flow control device 220 and the output interface 214. In other embodiments, the irrigation control unit 300 is directly coupled to the irrigation controller 330 at an input (not illustrated) of the irrigation controller 330. For example, the output interface 314 may be coupled by wireline or wirelessly to an interface (not shown) of the irrigation controller 330 which is coupled to the microcontroller 332. In these embodiments, the irrigation control unit 300 can communicate directly with the microcontroller 332. One advantage of the illustrated embodiment is that the irrigation control unit 300 can be coupled to any conventional programmable irrigation controller 330 independent of the functionality and make/model of the irrigation controller 330.

The user interacts with the user interface 306 to program the irrigation control unit 300. In preferred form, the irrigation control unit 300 should be programmed with the same or similar watering schedules as contained in irrigation controller 330. In one embodiment, the user inputs the same preprogrammed watering schedules that are stored in the irrigation controller 330 into the irrigation control unit 300. In another embodiment, the user inputs only the watering days and start times programmed into the irrigation controller 330. In further embodiments, the output interface 314 monitors the common line 222 over time and learns watering schedules programmed in the irrigation controller 330. For example, the output interface 314 is able to detect when an activation signal is applied to one of the activation lines 218 by sensing current flow on the common line 222. The user interface 306 may vary depending on different embodiments of the irrigation control unit 300. For example, the user interface 306 is similar to the user interface 206; however, not all embodiments require all components of the user interface 306.

Similar to the embodiments described above, the irrigation control unit 300 includes stored historical values of variables in the memory 104 (e.g., either pre-stored during manufacture, prior to sale or entered by the user) used at least in part to determine plant water requirements. Also, the processor 102 determines for each variable needed to determine the plant water requirements, whether a current value is available (e.g., from sensors or other user input). It also receives signals from one or more sensors 216 at the sensor input 312 that correspond to current values of the variables used at least in part to determine plant water requirements. Periodically, the processor 102 determines the plant water requirements such as described above. In different embodiments, the processor 102 uses the determined plant water requirements in different ways. For example in one embodiment, if the processor 102 determines that watering is not needed on a particular watering day, then the processor 102 ensures that watering does not occur on that day. For example, the processor 102 sends a signal to the output interface 314 to prevent irrigation. In one form, the output interface 314 comprises a controlled switch that when opened, electrically breaks the common line 222, which eliminates an electrical path for any signaling on any of the actuation lines 218. In another form, the output interface 314 sends a signal to the microcontroller 332 (via an input, not shown) instructing it to not irrigate on that particular day. In the event the microcontroller 302 determines that watering is needed but for a shorter duration than programmed, the processor 102 sends a signal to the output interface 314 at a specified time after irrigation has begun but before irrigation should be concluded. The output interface 314 then electrically breaks the common line 222 to interrupt irrigation. Alternatively, the processor 102 sends a signal to the microcontroller 332 via the output interface 314 instructing it to irrigate for a shortened duration. In some embodiments, the programmed watering duration is set for the peak watering duration that would be needed (e.g., set for peak summer watering needs); thus, there is no need to irrigate for a longer duration than preprogrammed. These embodiments are preferred when the output interface 314 is coupled to and acts as a switch to interrupt the common line 222. In other embodiments, in the event the microcontroller 302 determines that watering is needed during a particular period, but for a longer duration than preprogrammed, the processor 102 sends a signal via the output interface 314 to the microcontroller 332 (direct connection not illustrated) to instruct it to temporarily increase the program duration.

Figure 4:
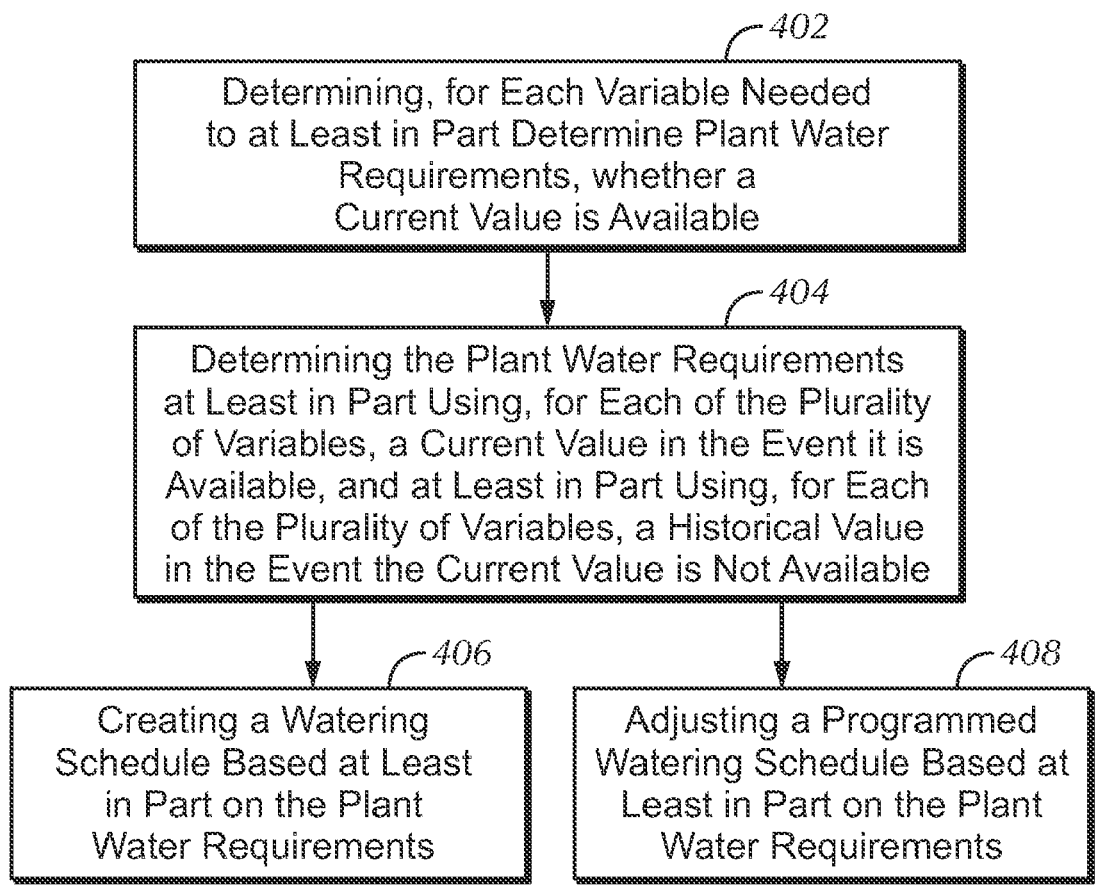
FIG. 4 is a flow chart illustrating a method of determining plant water requirements in accordance with several embodiments.

Referring next to FIG. 4, a flow chart is shown that illustrates a method of determining plant water requirements in accordance with several embodiments. These steps may be performed, for example, by the irrigation control units described herein, such as irrigation control units 100, 200 and 300. Generally, in order to make efficient use of water in an irrigation system in accordance for several embodiments, periodically, plant water requirements are determined based at least in part on a number of variables which are used to create and/or modify watering schedules. The plant water requirements are typically based on a mathematical model of the watering needs of plant life based on a number of variables including, but not limited to, temperature, solar radiation, humidity, wind speed, rainfall and soil moisture content. In preferred form, the plant water requirements are based on models for the evapotranspiration (ET), such as provided by the Penman-Monteith model, as described above. Other known models or approximations may be used. Furthermore, a user has selected how many sensors, and what type of sensors, will be used to provide current values of one of more variables. Additionally, historical values for one to more of these variables are pre-stored into a memory of irrigation control unit. The pre-stored values may be average or mean historical values for a given period of time, such as day, week, month, season, etc. In some embodiments, the pre-stored historical data values are stored in the irrigation control unit during manufacturing or otherwise prior to sale. In other embodiments, the pre-stored historical data is stored or loaded into the irrigation control unit at installation, for example downloaded or transferred from an external memory device into the memory of the irrigation control unit (e.g., via a computer or other input connection of the user interface). In other embodiments, the stored historical data is entered by the user, for example via the user interface. Such embodiments would allow the user to enter historical data for locations for which historical data is unavailable during manufacture or installation. In some embodiments, the historical data is pre-stored during manufacture, but can be replaced or supplemented with historical data entered by the user via the user interface.

Furthermore, other variables may have already been entered by a user. The user inputs may pertain to location, time of the year, soil type, gradient of the landscape, vegetation type, or other factor that may affect water schedules. In preferred form, the location information includes a zip code, a map code or a longitudinal or latitudinal coordinate to define the location that is being watered. In some embodiments, the user inputs the time of the year or some other periodic reference point so the controller can determine the current date (day, week, month), season or time of year. In some embodiments, the plant water requirements discussed below are adjusted by one or more local factors, such as some of the user entered variables.

Initially, for each variable needed to determine plant water requirements, it is determined whether a current value is available (Step 402). For example, this may be accomplished by knowing if a sensor providing current values of a variable is connected to the irrigation control unit. As described above, a processor makes this determination, for example, by: being informed by the sensor/s corresponding to the variable/s (either directly in signaling or in response to a query from the processor 102); being informed by the user via user input when the sensor/s corresponding to the variable/s is/are connected to the irrigation control unit; or detecting the presence or connection of the sensor/s corresponding to the variable/s. Alternatively, a processor (e.g., processor 102) checks to see if a current value of the variable is stored in a designated location in memory (e.g., memory 104). In other embodiments, a processor queries a sensor input to determine if a current value for that variable is available or can be readily obtained or measured. In some embodiments, the current value for one or more variables is input by the user (e.g., received directly from the user input or from memory storing the entered current value).

Next, plant water requirements are determined (e.g., calculated, estimated, etc.) at least in part using, for each of the plurality of variables, a current value in the event it is available and at least in part using, for each of the plurality of variables, a stored historical value in the event the current value is not available (Step 404). In one form, the current value/s are retrieved from the sensor input or are retrieved from memory (in the event the current value/s from the sensor input are buffered in or temporarily stored in memory). The historical values are retrieved from memory. As described above, and in accordance with several embodiments, historical values for the plurality of variables used to determine plant water requirements are stored in memory (e.g., pre-stored during manufacture or prior to sale or entered by the user). To the extent they are available, current values of those variables are used in place of the stored historical values. As a result, in some embodiments, the plant water requirements are determined at least using a combination of current values for one or more variables and stored historical values for one or more other variables. In some embodiments, multiple sets of historical values are stored in memory, each corresponding to a different geographic location or region (e.g., defined by zip code, map code, latitude and/or longitude, or other geographic identifier). The historical values corresponding to the specific geographic region are used to determine the plant water requirements. Furthermore, the historical values used (e.g., retrieved from memory) are stored values that correspond to the current date, season or time of year. In one example, if the current date is February 1, then the historical values that correspond to February 1 are used, e.g., either historical average values from previous years on this date, during the week of February 1, during the month of February, etc.

It is noted that in some embodiments, historical values for one or more of the plurality of variables are not stored in memory, for example when it is known that a sensor is available to provide a current value. For example, if a given irrigation control unit is manufactured with an integrated sensor (such as an integrated temperature sensor) or an external temperature sensor is provided with the sale of the unit, historical values of temperature are not required to be stored in the memory of irrigation control unit. In some embodiments, no historical values are pre-stored, but all historical data is entered by the user. As discussed above, a variety of models may be used to determine the plant water requirements. Additionally, other factors or adjustments not prestored in memory and not provided by sensors may be used at least in part to determine the plant water requirements. For example, user input variables such as crop characteristics, soil characteristics, slope, etc. may be used depending on the particular model used by the irrigation control unit or any local adjustments made. In preferred form, plant water requirements were determined using the Penman-Monteith model that uses temperature, solar radiation, humidity and wind speed to calculate a net ET value which is then adjusted by an amount of rainfall received since the last determination.

Again, as described above, the user has flexibility in determining for which variables the user will rely on historical values and for which variables the user will use currently sensed values. The user can make this decision based on the user's location, costs involved and tolerance for error.

Several embodiments may be used with a variety of models or equations to determine the plant water requirements. For example, several known models used to calculate evapotranspiration (one example of plant water requirements) include the Penman equation, the Penman-Monteith equation, the Blaney-Criddle equation, the Makkink equation and the Hargreaves equation. Furthermore, one or more of these models include sub-models to calculate or approximate one or more of the variables used in the model. For example, a sub-model may approximate humidity from minimum and maximum temperature, time of year, etc. Thus, it is understood that in some embodiments, one or more of these sub-models are used at least in part to determine the plant water requirements.

Once determined, the plant water requirements are used differently in different embodiments. According to several embodiments, a watering schedule is created based at least in part on the plant water requirements (Step 406). For example, if the plant water requirements are determined to be 0.1 inches of water that should be applied to the plant life, then the duration of watering needed to supply 0.1 inches of water is determined. Then, at a given start time, watering is initiated for the calculated duration. It is understood that the duration may be continuous or may be broken up into separate periods of time (i.e., separate start times). The time between separate start times may be short or long depending on the needs of the system, and may account for the slope of the soil. If it is determined that irrigation is not needed (e.g., the plant water requirements are negative), then watering is not supplied.

In a typical implementation, a user has preprogrammed a start time and watering days. Periodically (e.g., once per day), the irrigation control unit determines the plant water requirements and, for each watering day, determines if irrigation should occur. If irrigation should occur, the duration is calculated and watering is executed at the given start time for the duration.

Once the watering schedule is created, the schedule is either executed or transmitted to the device that executes the watering schedule. For example, at the determined start time, signals are generated by a processor to cause an activation signal to be applied to a given actuation line that will open/close a water flow control device (e.g., a latching or non-latching solenoid controlled valve or pump). The activation signal may be an AC voltage signal or DC pulse signal, for example. In some cases, the voltage signal is modulated by an encoder that outputs a signal to a multi-wire path having a plurality of decoder devices coupled thereto. Each decoder device is typically coupled to one or more water flow control devices.

According to several other embodiments, once the plant water requirements are determined, a programmed watering schedule is adjusted based at least in part on the plant water requirements (Step 408). In these embodiments, a preprogrammed water schedule exists, for example, preprogrammed by a user into an irrigation control unit that determined the plant water requirements (see for example, FIG. 2) or preprogrammed into an irrigation controller coupled to an irrigation control unit determining the plant water requirements (see for example, FIG. 3). In some embodiments, the schedule is adjusted by interrupting or overriding the scheduled watering completely or in part. Alternatively, a control message is generated to shorten the preprogrammed watering duration. This occurs when the plant water requirements are less than would be provided by the watering schedule. In other embodiments, the schedule is adjusted when it is determined that more watering should occur than preprogrammed, for example, by extending the watering duration or adding additional watering events.

Once the watering schedule is adjusted, the adjusted schedule is either executed or transmitted to the device that executes the watering schedule such as described above. Alternatively, the schedule being executed by another irrigation controller is interrupted at the appropriate time to effect the adjustment. For example, referring to the irrigation control unit 300 of FIG. 3, the processor 102 determines when watering should be interrupted (or even allowed at all), and outputs a signal to the output interface 314 to open or electrically break the common line 222, stopping all irrigation at the flow control devices 220. Alternatively, a signal is transmitted to the irrigation controller 330 executing the water schedule to be adjusted, the signal instructing that the controller should adjust the programmed water schedule.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. An irrigation control unit comprising:
    a memory storing historical values of a plurality of variables used at least in part in calculating plant water requirements;
    at least one input adapted to receive signals corresponding to current values of one or more of the plurality of variables;
    a processor coupled to the at least one input and the memory, the processor adapted to determine the plant water requirements at least in part using, for each of the plurality of variables on a variable by variable basis, a current value in the event the current value is available and at least in part using, for each of the plurality of variables, a stored historical value in the event the current value is not available.

2. The irrigation control unit of claim 1 wherein the plant water requirements are based on a determination of an evapotranspiration (ET) value.

3. The irrigation control unit of claim 1 wherein the plurality of variables comprises two or more parameters selected from a group consisting of: temperature, solar radiation, humidity, wind speed and an amount of rainfall.

4. The irrigation control unit of claim 1 further comprising at least one sensor coupled to the at least one input.

5. The irrigation control unit of claim 4 wherein the at least one sensor comprises a sensor selected from a group consisting of: a temperature sensor, a solar radiation sensor, a humidity sensor, a wind speed and a rainfall sensor.

6. The irrigation control unit of claim 1 wherein the memory stores multiple sets of the stored historical values, each set corresponding to a different geographic region.

7. The irrigation control unit of claim 6 wherein, based on a user input, the processor selects a given set of the stored historical values for use in determining the plant water requirements.

8. The irrigation control unit of claim 7 wherein the user input comprises an input selected from a group consisting of: a zip code, a longitudinal coordinate, a latitudinal coordinate, and a map code.

9. The irrigation control unit of claim 1 wherein the signals received at the at least one input correspond to current values of the one or more of the plurality of variables for a geographic region local to the irrigation control unit.

10. The irrigation control unit of claim 1 further comprising:
    a first housing containing the irrigation control unit and an irrigation controller coupled to and controlling operation of flow control devices.

11. The irrigation control unit of claim 1 further comprising:
    a first housing containing the irrigation control unit, the first housing adapted to be coupled to a second housing containing an irrigation controller coupled to and controlling operation of flow control devices.

12. The irrigation control unit of claim 1 wherein the processor is adapted to determine, based on the plant water requirements, adjustments to a programmed watering schedule.

13. The irrigation control unit of claim 12 wherein the processor is adapted to generate signaling to cause the adjustments to the programmed watering schedule.

14. The irrigation control unit of claim 1 wherein the processor is adapted to determine a watering schedule in order to meet the plant water requirements.

15. The irrigation control unit of claim 1 wherein the stored historical values are stored in the memory prior to the irrigation control unit being sold.

16. The irrigation control unit of claim 1 wherein the processor is adapted to determine the plant water requirements at least in part using the current value for at least one of the plurality of variables and the stored historical value for at least one of the plurality of variables.

17. A processor implemented method for use in irrigation control comprising:
   determining, using the processor, for each of a plurality of variables used at least in part to determine plant water requirements, whether a current value is available; and
   determining, using the processor, the plant water requirements at least in part using, for each of the plurality of variables on a variable by variable basis, the current value in the event the current value is available and at least in part using, for each of the plurality of variables, a stored historical value in the event the current value is not available.

18. The method of claim 17 wherein the determining the plant water requirements step comprises determining an evapotranspiration (ET) value.

19. The method of claim 17 wherein the plurality of variables comprises two or more parameters selected from a group consisting of: temperature, solar radiation, humidity, wind speed, and an amount of rainfall.

20. The method of claim 17 further comprising:
   receiving, for each of one or more of the plurality of variables, the current value from a sensor.

21. The method of claim 20 wherein the sensor comprises a sensor selected from a group consisting of: a temperature sensor, a solar radiation sensor, a humidity sensor, a wind speed and a rainfall sensor.

22. The method of claim 17 wherein the determining the plant water requirements step further comprises using, for each of the plurality of variables, a stored historical value from a set of stored historical values in the event the current value is not available, the set corresponding to a geographic region for which the plant water requirements are to be determined.

23. The method of claim 17 wherein, for each of the plurality of variables, the current value comprises a value local to the geographic region for which the plant water requirements are being determined.

24. The method of claim 17 further comprising:
   determining, using the processor, based on the plant water requirements, adjustments to a programmed watering schedule.

25. The method of claim 17 further comprising:
   generating, using the processor, signaling to cause the adjustments to the programmed watering schedule.

26. The method of claim 17 further comprising:
   determining, using the processor, a watering schedule based at least in part on the plant water requirements.

27. The method of claim 17 wherein the determining steps are performed by an irrigation control unit including the processor, the stored historical value being stored in a memory of the irrigation control unit prior to a sale of the irrigation control unit.

28. The method of claim 17 wherein the determining the plant water requirements step comprises:
   determining, using the processor, the plant water requirements at least in part using the current value for at least one of the plurality of variables and the stored historical value for at least one of the plurality of variables.

29. An irrigation control unit comprising:
   means for determining, using a processor, for each of a plurality of variables used at least in part to determine plant water requirements, whether a current value is available; and
   means for determining, using the processor, the plant water requirements at least in part using, for each of the plurality of variables on a variable by variable basis, the current value in the event the current value is available and at least in part using, for each of the plurality of variables, a stored historical value in the event the current value is not available.

30. An irrigation control unit comprising:
   a memory storing a set of historical values of a plurality of variables used at least in part in calculating plant water requirements, the set specific to a geographic region, wherein the plurality of variables comprises two or more parameters selected from a group consisting of: temperature, solar radiation, humidity, wind speed and an amount of rainfall, wherein the historical values are stored in the memory prior to the irrigation control unit being sold;
   a user interface adapted to receive a user input indicating a location of the irrigation control unit;
   at least one input adapted to receive signals corresponding to current values of one or more of the plurality of variables for a first geographic region corresponding to the location of the irrigation control unit;
   a processor coupled to the at least one input and the memory, the processor adapted to:
   select, based on the user input, the set of the historical values of the plurality of variables; and
   determine the plant water requirements based on a determination of an evapotranspiration (ET) value at least in part using, for each of the plurality of variables on a variable by variable basis, a current value in the event the current value is available and at least in part using, for each of the plurality of variables, a stored historical value in the event the current value is not available, and
   wherein the processor is adapted to determine the plant water requirements at least in part using the current value for at least one of the plurality of variables and the stored historical value for at least one of the plurality of variables; and
   at least one sensor coupled to the at least one input and selected from a group consisting of: a temperature sensor, a solar radiation sensor, a humidity sensor, a wind speed and a rainfall sensor.

* * * * *